United States Patent
Fusco et al.

(10) Patent No.: US 12,339,884 B2
(45) Date of Patent: Jun. 24, 2025

(54) UPDATING WINDOW REPRESENTATIONS OF SLIDING WINDOW OF TEXT USING ROLLING SCHEME

(71) Applicant: International Business Machines Corporation, Armonk, NY (US)

(72) Inventors: Francesco Fusco, Zürich (CH); Diego Matteo Antognini, Ruvigliana (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/166,681

(22) Filed: Feb. 9, 2023

(65) Prior Publication Data

US 2024/0273125 A1    Aug. 15, 2024

(51) Int. Cl.
*G06F 16/353*    (2025.01)
*G06F 16/334*    (2025.01)

(52) U.S. Cl.
CPC ........ *G06F 16/3346* (2019.01); *G06F 16/353* (2019.01)

(58) Field of Classification Search
CPC .................. G06F 16/3346; G06F 16/353
See application file for complete search history.

(56) References Cited

U.S. PATENT DOCUMENTS

| | | | |
|---|---|---|---|
| 9,130,972 B2* | 9/2015 | Barkan | G06F 16/22 |
| 9,361,327 B1 | 6/2016 | Chen, Jr. et al. | |
| 11,074,412 B1* | 7/2021 | Leeman-Munk | G06N 3/08 |
| 11,226,992 B1* | 1/2022 | Ramsey | G06F 16/285 |
| 11,361,571 B1 | 6/2022 | Fusco et al. | |
| 11,907,886 B2* | 2/2024 | Grob | G06Q 10/08 |
| 2010/0017850 A1* | 1/2010 | More | H04L 63/08 726/2 |
| 2015/0019503 A1* | 1/2015 | Akirav | G06F 16/1748 707/692 |
| 2019/0034413 A1* | 1/2019 | Rosewell | G06F 16/2246 |
| 2021/0011974 A1* | 1/2021 | An | G06V 30/40 |
| 2021/0117868 A1* | 4/2021 | Sriharsha | G06F 17/18 |
| 2021/0141863 A1* | 5/2021 | Wu | G06N 3/08 |
| 2021/0227007 A1* | 7/2021 | Lu | G06F 16/901 |
| 2021/0286989 A1* | 9/2021 | Zhong | G06F 40/177 |
| 2021/0336770 A1* | 10/2021 | Ahmed | H04L 9/008 |
| 2021/0390418 A1* | 12/2021 | Mass | G06N 3/08 |

(Continued)

FOREIGN PATENT DOCUMENTS

| | | | | |
|---|---|---|---|---|
| CN | 102598007 B | * | 3/2017 | ....... G06F 17/30312 |
| CN | 110826310 A | * | 2/2020 | ........... G06F 16/951 |

(Continued)

OTHER PUBLICATIONS

Broder, "Identifying and Filtering Near-Duplicate Documents," in In COM '00: Proceedings of the 11th Annual Symposium on Combinatorial Pattern Matching. Springer-Verlag, 2000, pp. 1-10.

(Continued)

*Primary Examiner* — Tarek Chbouki
(74) *Attorney, Agent, or Firm* — James L. Olsen

(57) ABSTRACT

An example system includes a processor to compute a token-level fingerprint for each of a number of tokens in a received window of text. The processor can compute a window representation for a window of text based on the token-level fingerprints. The processor can also update the window representation in a rolling scheme when sliding the window of text.

13 Claims, 15 Drawing Sheets

(56) References Cited

U.S. PATENT DOCUMENTS

| | | | |
|---|---|---|---|
| 2021/0406366 A1* | 12/2021 | Betser | H04L 63/0245 |
| 2022/0019664 A1 | 1/2022 | Perry et al. | |
| 2022/0101188 A1* | 3/2022 | Lourentzou | G06F 16/243 |

FOREIGN PATENT DOCUMENTS

| | | | | |
|---|---|---|---|---|
| CN | 110990538 A | | 4/2020 | |
| CN | 111274382 A | | 6/2020 | |
| CN | 116541481 A | * | 8/2023 | |
| CN | 117332077 A | * | 1/2024 | |
| WO | WO-2021012958 A1 | * | 1/2021 | G06F 16/3344 |
| WO | 2022147746 A1 | | 7/2022 | |

OTHER PUBLICATIONS

Fusco et al., "pNLP-Mixer: an Efficient all-MLP Architecture for Language", arXiv, May 25, 2023, 8 Pages, https://arxiv.org/abs/2202.04350.

Karp et al., "Efficient Randomized Pattern-matching Algorithms", IBM Journal of Research and Development, Mar. 1987, pp. 249-260, vol. 31, No. 2.

Manku et a;, "Detecting Near-Duplicates for Web Crawling", in WWW'07: Proceedings of the 16th international conference on World Wide Web. New York, NY, USA: ACM, 2007, pp. 141-150.

Shrivastava et al., "In Defense of Minhash over Simhash" in AISTATS, ser. JMLR Workshop and Conference Proceedings, 2014, pp. 886-894, vol. 33.

Aho et al., "Efficient string matching: An aid to bibliographic search." Commun. ACM, vol. 18, No. 6, 1975, pp. 333-340.

Anderson et al., "Superbloom: Bloom filter meets Transformer", arXiv, Feb. 11, 2020, 17 pages.

Andoni et al., "Practical and Optimal LSH for Angular Distance", Advances in Neural Information Processing Systems, vol. 28. Curran Associates, Inc., 2015, 9 pages.

Basat et al. "Poster Abstract: A Sliding Counting Bloom Filter", IEEE Conference on Computer Communications Poster and Demo (INFOCOM'17 Poster/Demo), 2017, 2 pages.

Beltagy et al., "Longformer: The Long-Document Transformer", arXiv, Dec. 2, 2020, 17 pages.

Bloom, "Space/time trade-offs in hash coding with allowable errors," Commun. ACM, vol. 13, No. 7, p. Jul. 1970, 422-426.

Bojanowski et al., "Enriching word vectors with subword information," Transactions of the Association for Computational Linguistics, vol. 5, 2017, pp. 135-146.

Bowman et al., "A large annotated corpus for learning natural language inference", in Pro-ceedings of the 2015 Conference on Empirical Methods in Natural Language Processing. Lisbon, Portugal: Association for Computational Linguistics, Sep. 2015, pp. 632-642.

Clark et al., "ELECTRA: Pre-training text encoders as discriminators rather than generators," Published as a conference paper at ICLR 2020, 18 pages.

Cormen et al., "Introduction to Algorithms", Second Edition, The MIT Press, 2001, 984 pages.

Devlin et al., "BERT: Pre-training of Deep Bidirectional Transformers for Language Understanding", in Proceedings of the 2019 Conference of the North American Chapter of the Association for Computational Linguistics: Human Language Technologies, vol. 1 (Long and Short Papers). Minneapolis, Minnesota: Association for Computational Linguistics, Jun. 2019, pp. 4171-4186.

Fan et al., "Summary Cache: A Scalable Wide-Area Web Cache Sharing Protocol", IEEE/ACM Trans. Netw., vol. 8, No. 3, Jun. 2000, pp. 281-293.

Faro et al., "A multiple sliding windows approach to speed up string matching algorithms", in Experimental Algorithms—11th International Symposium, SEA 2012, 2012, 12 pages.

Gao et al., "SimCSE: Simple contrastive learning of sentence embeddings," in Proceedings of the 2021 Conference on Empirical Methods in Natural Language Processing. Online and Punta Cana, Dominican Republic: Association for Computational Linguistics, Nov. 2021, pp. 6894-6910.

Hinton et al., "Distilling the knowledge in a neural network", arXiv, Mar. 9, 2015, 9 pages.

IBM. "Deep Search", retrieved from web https://ds4sd.github.io/, dated Apr. 1, 2025, 12 pages.

Jiang et al., "A Rolling Hash Algorithm and the Implementation to LZ4 Data Compression", IEEE Access, vol. 8, 2020, pp. 35529-35534.

Kaliamoorthi et al., "Distilling Large Language Models into Tiny and Effective Students using pQRNN", arXiv, Jan. 21, 2021, 12 pages.

Kitaev et al., "Reformer: The efficient trans-former", Published as a conference paper at ICLR 2020, 2020, 12 pages.

Knuth et al., "Fast Pattern Matching in Strings", SIAM Journal on Computing, vol. 6, No. 2, Mar. 1977, pp. 323-350.

Kudo, "Subword regularization: Improving neural network translation models with multiple subword candidates," in Proceedings of the 56th Annual Meeting of the Association for Computational Linguistics (vol. 1: Long Papers). Melbourne, Australia: Association for Computational Linguistics, Jul. 2018, pp. 66-75.

Lan et al., "Albert: A lite bert for self-supervised learning of language representa- tions,", Published as a conference paper at ICLR 2020, 2020, 17 pages.

Lecun et al. "Object Recognition with Gradient-Based Learning", Lecture Notes in Computer Science, Oct. 22, 1999, pp. 319.

Lewis et al., "BART: Denoising sequence-to-sequence pre-training for natural language generation, translation, and comprehension", in Proceedings of the 58th Annual Meeting of the Association for Computational Linguistics. Online: Association for Computational Linguistics, Jul. 2020, pp. 7871-7880.

Liu et al., "ROBERTa: A Robustly Optimized BERT Pretraining Approach", arXiv, Jul. 26, 2019, 13 pages.

Menghani, "Efficient Deep Learning: A Survey on Making Deep Learning Models Smaller, Faster, and Better", arXiv, Jun. 21, 2021, 44 pages.

Naor et al. "Sliding Bloom Filters", Department of Computer Science and Applied Mathematics, 2013, pp. 513-523.

Rabin Michael O. "Fingerprinting by Random Polynomials", Department of Mathematics, 1981, 14 pages.

Raffel et al., "Exploring the Limits of Transfer Learning with a Unified Text-to-Text Transformer", Journal of Machine Learning Research, vol. 21, 2020, pp. 1-67.

Ravi, "Efficient on-device models using neural projections," in Proceed-ings of the 36th International Conference on Machine Learning, ser. Proceedings of Machine Learning Research, vol. 97. PMLR, Jun. 9-15, 2019, 10 pages.

Ravi, "ProjectionNet: Learning Efficient On-Device Deep Networks Using Neural Projections", arXiv, Aug. 9, 2017, 12 pages.

Schuster et al., "Japanese and korean voice search," in International Conference on Acoustics, Speech and Signal Processing, 2012, pp. 5149-5152.

Sennrich et al., "Neural Machine Translation of Rare Words with Subword Units", Proceedings of the 54th Annual Meeting of the Association for Computational Linguistics (vol. 1: Long Papers). Berlin, Germany: Association for Computational Linguistics, Aug. 2016, pp. 1715-1725.

Vaswami, "Attention is all you need", 31st Conference on Neural Information Processing Systems (NIPS 2017), 2017, 11 pages.

Williams et al., "A broad-coverage challenge corpus for sentence understanding through inference", Proceedings of the 2018 Conference of the North American Chapter of the Association for Computational Linguistics: Human Language Technologies, vol. 1 (Long Papers). New Orleans, Louisiana: Association for Computational Linguistics, Jun. 2018, pp. 1112-1122.

* cited by examiner

SimGet

Datasets:

arxiv_merged_cbf.bin (none, words=503705, vocab_size=50.705)

1302 — Keywords:

graph_neural_network

Clustering:

kmeans k=5

Cluster

Toggle table

Search

| Word | Word ID | Score | Count | Class ID |
|---|---|---|---|---|
| graph_neural_networks | 185401 | 97 | 0 | 0 |
| deep_graph_neural_network | 98376 | 94 | 0 | 0 |
| deep_graph_neural_networks | 98377 | 93 | 0 | 0 |
| graph_convolution_neural_network | 185172 | 92 | 0 | 0 |
| graph_convolution_neural_networks | 185173 | 91 | 0 | 0 |
| network_graph | 293178 | 90 | 0 | 0 |
| graph_network | 185392 | 90 | 0 | 0 |
| graphena_network | 185738 | 90 | 0 | 0 |
| graph_convolutional_neural_network | 185183 | 90 | 0 | 0 |
| network_graphs | 293179 | 89 | 0 | 0 |
| graph_convolutional_neural_networks | 185184 | 89 | 0 | 0 |
| graph_networks | 185393 | 89 | 0 | 0 |
| graph_neural_network_model | 185399 | 88 | 0 | 0 |
| hierarchical_graph_neural_network | 194062 | 88 | 0 | 0 |
| novel_graph_neural_network | 303159 | 87 | 0 | 0 |
| graph_neural_network_framework | 185398 | 87 | 0 | 0 |
| graph_neural_network_models | 185400 | 85 | 0 | 0 |

1402A Query  A metasearch engine (or search aggregator) is an online Information retrieval tool that uses the data of a web search engine to produce its own results.

Cosine Sim. *Top-k most similar sentences*

0.89  Googleshare is a measure of mindshare based on the results of Google search engine queries.
0.88  A metasearch engine can also hide the searcher's IP address from the search engines queried thus providing privacy to the search.
0.86  Users can do this by searching in a Microsoft Excel chemical list or a website offering the search by chemical name or CAS Number.

1402B Query  In addition to the ATLAS-03 investigations, the mission included deployment and retrieval of the Cryogenic Infrared Spectrometer Telescope for Atmosphere, or CRISTA.

Cosine Sim. *Top-k most similar sentences*

0.89  The mission also deployed and retrieved the Spartan-207/IAE (Inflatable Antenna Experiment) satellite and rendezvoused with a test satellite.
0.87  Together the Shuttle and station crews conducted various on-orbit joint US/Russian life science investigations with Spacelab along with the Shuttle Amateur Radio Experiment-II (SAREX-II) experiment.
0.87  The mission carried Spacelab and included a logistical resupply of "Mir".

1402C Query  He also wrote some concert works for orchestral forces.

Cosine Sim. *Top-k most similar sentences*

0.93  His compositions included several operas, numerous romances, sacred music, and a sonata for harp.
0.92  Nevertheless he played many more concerts and piano recitals.
0.92  He also played works by Bach, Chopin, Hummel, Mendelssohn and several other composers.

| Query | Some viruses use serpins to disrupt protease functions in their host. |
|---|---|
| *Cosine Sim.* | *Top-k most similar sentences* |
| 0.91 | The use of serum deprivation - partially or completely removing the serum and its nutrients - has been shown to arrest and synchronize cell cycle progression in G phase, for example in neonatal mammalian astrocytes and human foreskin fibroblasts. |
| 0.89 | Predicted serpin genes are sporadically distributed in prokaryotes. |
| 0.89 | Some serpins are both protease inhibitors and perform additional roles. |

1402E

| Query | In particular, the bombing campaign Operation Rolling Thunder destroyed significant amounts of infrastructure, making life more difficult for North Vietnamese citizens. |
|---|---|
| *Cosine Sim.* | *Top-k most similar sentences* |
| 0.81 | During the independence war against Napoleon's troops the city suffered great destruction, and it made the crisis worse. |
| 0.81 | The war itself involved numerous events that had major impacts throughout Indochina. |
| 0.80 | During the Guinea-Bissau Civil War, the archives suffered destruction and damage to more than half of its holdings. |

UPDATING WINDOW REPRESENTATIONS OF SLIDING WINDOW OF TEXT USING ROLLING SCHEME

BACKGROUND

The present techniques relate to computing representations of text. More specifically, the techniques relate to computing representations of text using a sliding window.

SUMMARY

According to an embodiment described herein, a system can include processor to compute a token-level fingerprint for each of a number of tokens in a received window of text. The processor can also further compute a window representation for a window of text based on the token-level fingerprints. The processor can also update the window representation in a rolling scheme when sliding the window of text.

According to another embodiment described herein, a method can include computing, via a processor, a token-level fingerprint for each of a number of tokens in a received window of text. The method can further include computing, via the processor, a window representation for a window of text based on the token-level fingerprints. The method can also further include updating, via the processor, the window representation in a rolling scheme when sliding the window of text.

According to another embodiment described herein, a computer program product for computing window representations of text can include computer-readable storage medium having program code embodied therewith. The program code executable by a processor to cause the processor to compute a token-level fingerprint for each of a number of tokens in a received window of text. The program code can also cause the processor to compute a window representation for a window of text based on the token-level fingerprints. The program code can also cause the processor to update the window representation in a rolling scheme when sliding the window of text.

BRIEF DESCRIPTION OF THE SEVERAL VIEWS OF THE DRAWINGS

FIG. 13 is a screenshot of an example results of a fuzzy matching executed according to embodiments described herein; and FIGS. 14A and 14B are tables of example results of a semantic similarity executed according to embodiments described herein.

DETAILED DESCRIPTION

Figure 1:
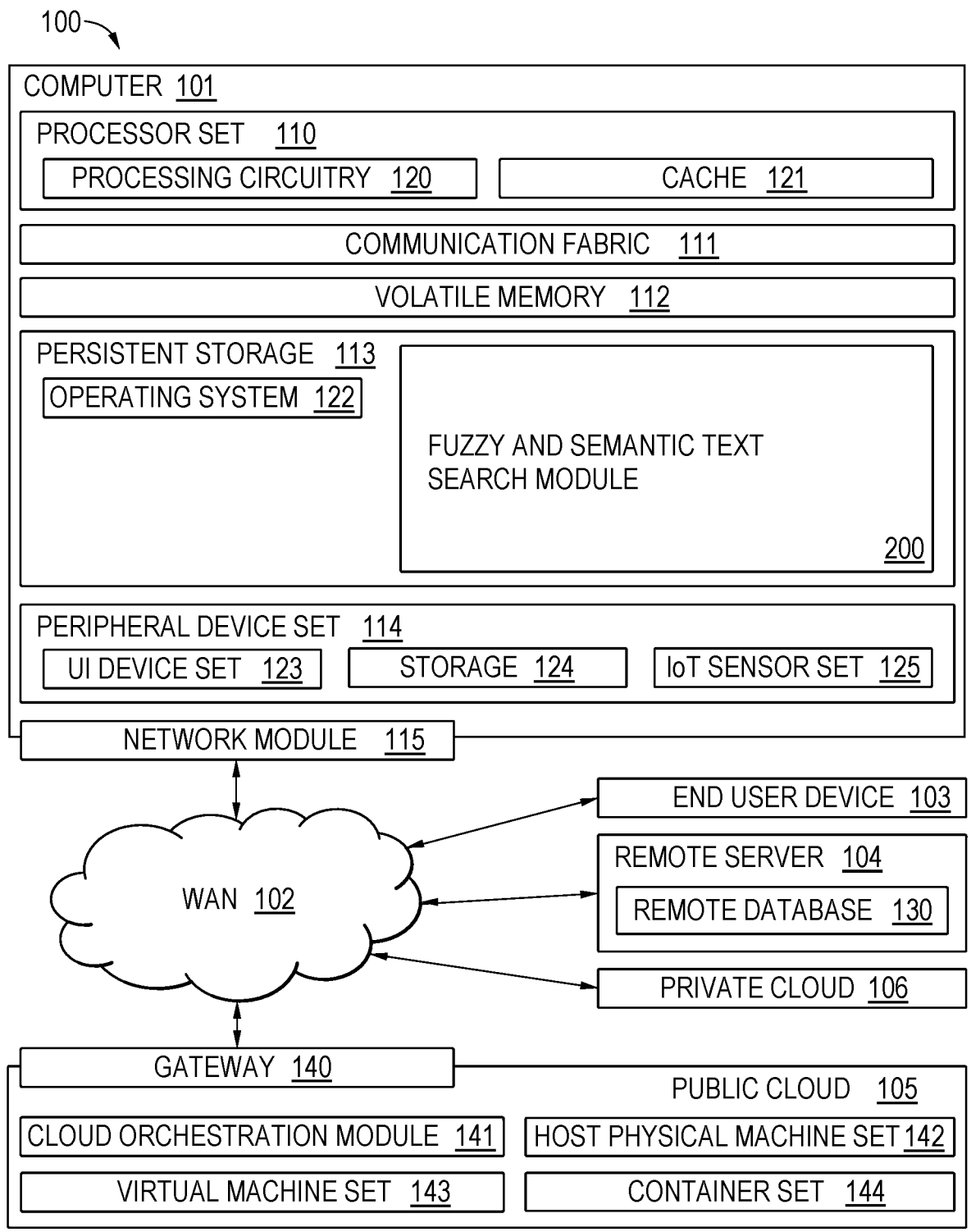
FIG. 1 is a block diagram of an example computing environment that contains an example of an environment for the execution of at least some of the computer code involved in performing the inventive methods, such as a fuzzy and semantic text search module.

Modern language models use special tokenization techniques which have been introduced to represent the text with a finite, known a-priori, and usually limited in size set of subword units. The idea of tokenizers is to train a vocabulary of subword units that can be used compositionally to encode any text. For example, a tokenizer trained on general-domain corpora would encode the word "paracetamol" into ["para", "ce", "tam", "ol"]. In practice, subword unit tokenization algorithms have solved the problem of out-of-vocabulary words, as every token can be expressed as a combination of tokens belonging to a vocabulary. In fact, those techniques have been introduced to reduce the vocabulary size for embeddings stored in large language models. However, while subword-unit tokenizers substantially reduce the vocabulary size of language models, storing embedding matrices for the subword unit vocabularies may still require significant use of space in memory. For example, approximately 120 megabytes may be used for a large BERT model.

According to embodiments of the present disclosure, a system includes a processor that can compute a token-level fingerprint for each of a number of tokens in a received window of text. The processor can also compute a window representation for a window of text based on the token-level fingerprints. The processor can then update the window representation in a rolling scheme when sliding the window of text. Thus, embodiments of the present disclosure may thus be used to implement fuzzy matching and semantic searches using a sliding window approach. In various examples, given a query as input, the embodiments described herein enable retrieval of all occurrences of text that is similar at the surface level or at the semantic level, or both. In some embodiments, the embodiments further include natural language processing means, such as projection-based models, and combines them with well-known locality-sensitive hashing (LSH) techniques, such as MinHash and SimHash, to provide an improved search experience.

LSH is a technique commonly used for clustering. LSH can be seen as an online clustering method that allows elements that are close to each other according to a metric to fall in the same clustering bucket with high probability. For example, the metric may be a Jaccard similarity metric. The embodiments described herein use MinHash and SimHash to implement an efficient sliding window approach which resembles rolling hashes. Rolling hashes are sometimes used to perform exact string matching over a text using a rolling window. The size of the window has the same size, in characters, of the text to be searched for (i.e., the input text). To search for the input text, one can compute the hash value of the input text, and then compare the input text with the hash value $h_0$ of the first n-character window $w_0$ of the corpus. To find all the potential matches, one has to slide the text window by one character and repeat the process till the end of the corpus. To make the search across the entire corpus efficient, some algorithms use Rabin's fingerprints, which allows the hash value $h_1$ corresponding the n character-long window $w_1$ of the corpus (i.e., $c_1, \ldots, c_{n+1}$) to be computed by updating $h_0$ with the removed character in position 0 (i.e., $c_0$) and the added character in position n+1 (i.e., $c_{n+1}$) instead of computing the n hashes. The embodiments described herein are in practice a rolling approach, but instead of using Rabin's fingerprints as the representation of the text, the embodiments described herein use LSH fingerprints, such as MinHash fingerprints. In practice, any LSH method for text can be used as long as the operation is associative and allows to update the data structure efficiently when rolling windows. Additionally, instead of working at the character level, our approach works at the subword-unit levels: the window iterates over the corpus by one or more subword units at the time. In various embodiments, a combination of MinHash and SimHash with subword-unit tokenizers are thus used to implement a rolling hashing mechanism without using hash functions over strings at runtime. In contrast with traditional rolling hashes, the embodiments described herein use representations that can be used as input for projection-based model. This way, we can extract a text representation that can be used as it is to implement fuzzy matching, or used as input for projection-based models to implement semantic matching. The embodiments thus enable implementation of fuzzy matching and semantic searches using a sliding window approach. Given the text query as input, the embodiments enable to retrieve all occurrences of text that is similar at the surface level or at the semantic level, or both. Compared to existing approaches, our method combines both searches in a unified setup and enables totally new search experiences. The method can be used as a replacement for real-time search tools, but has numerous applications ranging from question answering (QA), high-speed indexing, and information retrieval.

For example, the embodiments enable selective creation of embeddings for a term. In particular, implementing semantic search via dense representation is highly desirable but extremely expensive to offer to users due to the infrastructure costs required to implement nearest neighbor searches over billion of statements. For platforms targeting customers in multiple and diverse domains, it is also important to keep the infrastructure costs low while serving specific needs. In this regard, the embodiments herein enable the high-speed creation of indexes for morphology search, which can be used to selectively drive the creation dense representation. In fact, morphology search via sparse representations, such as the CBF or the SimHash fingerprint described herein, has a lower memory and disk footprint compared to dense representations. In various examples, those morphology representations can be stored for all terms in the corpora and then selectively decide for which terms keeping a dense representation would be beneficial to improve the recall of the searches.

Moreover, the embodiments herein enable selective ingestion strategies for large corpora. For example, the embodiments provide significant flexibility at ingestion time to select which part of large corpora could be of interest of a specific customer use case. By providing queries as input to the embodiments described herein, a decision can be made as to which documents for a given corpora need to be indexed with full-text indices or annotated with domain-specific annotators.

Furthermore, the embodiments herein enable cold-storage for semantic indexing. As mentioned before, the morphology representations require substantially less space than dense representation and, in addition, they are easier to compress with standard compression tools. In this regard, the embodiments herein can be used to have systems offering a pause and resume functionality. In fact, using embodiments described herein, a system can be frozen together with the morphology indices, eventually compressed with standard tools to save resources, and maintained in storage systems for cold storage. The dense representations, which are larger in size and hard to compress, can thus be simply thrown away and rebuilt on-the-fly from the morphology representation when the system is resumed.

Finally, the embodiments herein also enable unsupervised document tagging. In particular, automatically associating a disjoint set of key phrases and keywords to paragraphs or documents enables faster and more accurate search in a large collection of texts. The embodiments described herein can be used to assign informative and diverse keywords by leveraging altogether a counting bloom filter (CBF) for MinHash, or the histogram obtained with the SimHash approach, and the dense representation resulting from the projection. More specifically, as one example, given a document, a processor can encode each sentence using both representations and average them to create two document-level embeddings. Assuming a database of multiword expressions, the processor can compute the similarity of the dual document-level representation with the ones in database using the counting bloom filter/histogram and the dense representation, enabling fuzzy and semantic matching. Therefore, the resulting tags are likely informative and diverse because they combine words and multiword expressions that are morphologically similar to the ones of the query document, and also have similar semantics.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as fuzzy and semantic text search module 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
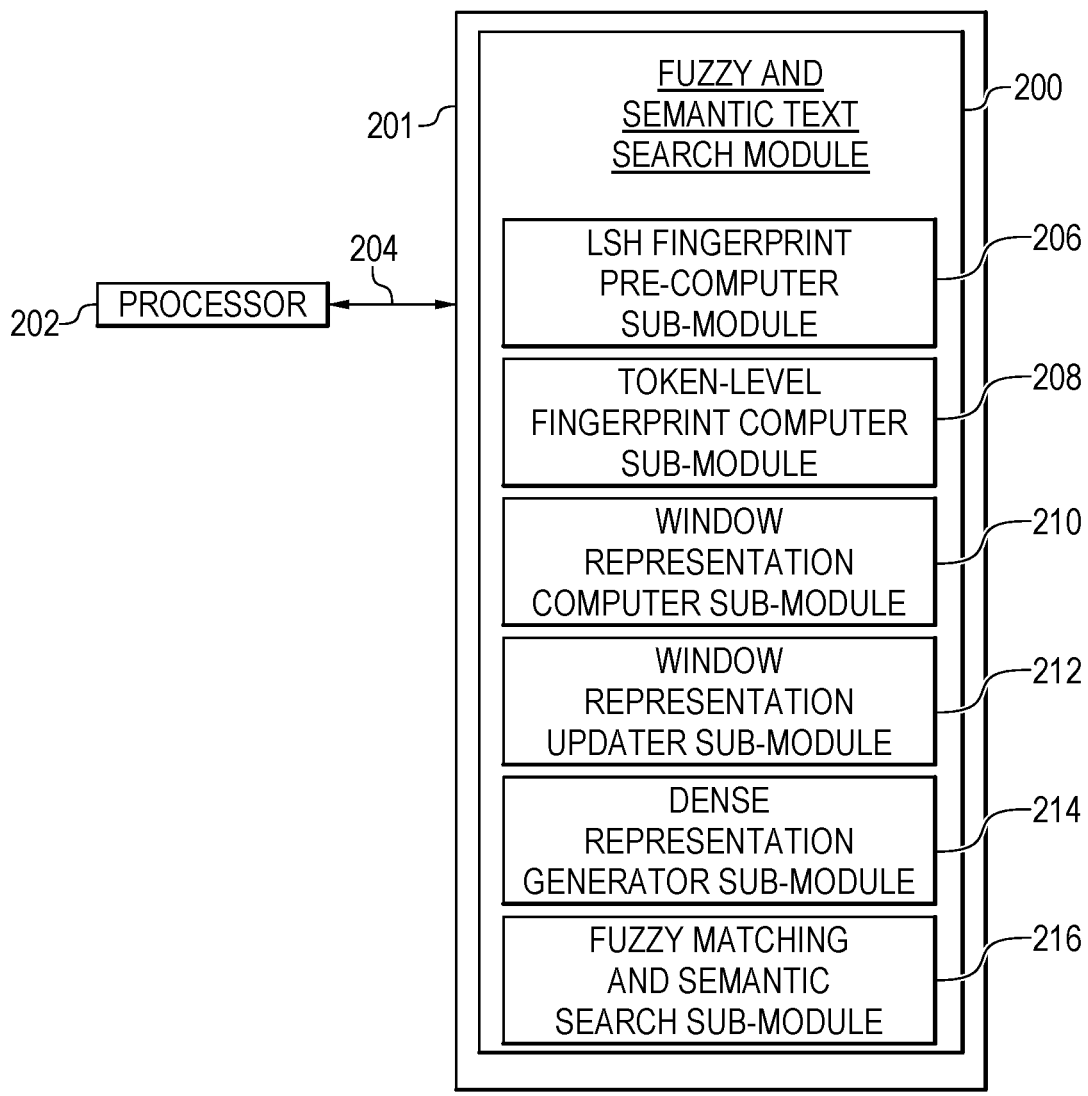
FIG. 2 is an example tangible, non-transitory computer-readable medium that can execute fuzzy and semantic text search over a sliding window of text.

Referring now to FIG. 2, a block diagram is depicted of an example tangible, non-transitory computer-readable medium 201 that can execute fuzzy and semantic text search over a sliding window of text. The tangible, non-transitory, computer-readable medium 201 may be accessed by a processor 202 over a computer interconnect 204. Furthermore, the tangible, non-transitory, computer-readable medium 201 may include code to direct the processor 202 to perform the operations of the methods 300-500 of FIGS. 3-5.

The various software components discussed herein may be stored on the tangible, non-transitory, computer-readable medium 201, as indicated in FIG. 2. For example, the fuzzy and semantic text search module 200 includes an LSH fingerprint pre-computer sub-module 206 that includes code to precompute LSH fingerprints of a set of subword-units belonging to a vocabulary of a subword-unit tokenizer using a locally-sensitive hashing (LSH)-based method. For example, the LSH-based method may be MinHash or SimHash. The fuzzy and semantic text search module 200 also includes a token-level fingerprint computer sub-module 208 that includes code to compute a token-level fingerprint for each of a number of tokens in a received window of text. For example, the token-level fingerprint may be a word fingerprint. The token-level fingerprint computer module 208 also includes code to compute the token-level fingerprint based on a number of precomputed locality-sensitive hashing (LSH) fingerprints. The fuzzy and semantic text search module 200 also includes a window representation computer sub-module 210 that includes code to compute a window representation for a window of text based on the token-level fingerprints. The window representation computer sub-module 210 also includes code to. The fuzzy and semantic text search module 200 also includes a window representation updater sub-module 212 that includes code to update the window representation in a rolling scheme when sliding the window of text. The fuzzy and semantic text search module 200 also includes a dense representation generator sub-module 214 that includes code to use the window representation as input for a projection-based sentence encoder model to infer a dense representation for the window and compare the dense representation of the window with a dense representation of an input query to execute a semantic matching of the input query against the text in the window. The fuzzy and semantic text search module 200 also includes a fuzzy matching and semantic search sub-module 216 that includes code to compare the dense representation of the window with a dense representation of an input query to execute a semantic matching of the input query against the text in the window. In some examples, the fuzzy matching and semantic search sub-module 216 includes code to receive a text query, compute a query representation based on computed token-level fingerprints, and compare the query representation with the window representation using a similarity function. In this manner, the fuzzy matching and semantic search sub-module 216 may also execute a fuzzy matching.

Figure 3:
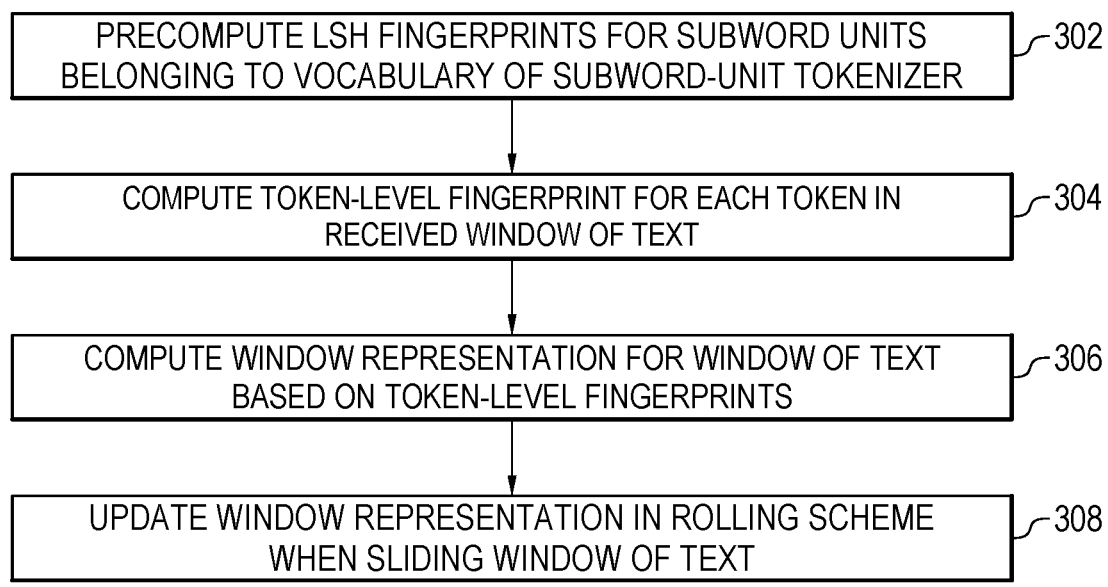
FIG. 3 is a process flow diagram of an example method that can compute window representations over a sliding window of text without hash computation over the full-text.

FIG. 3 is a process flow diagram of an example method that can compute window representations over a sliding window of text without hash computation over the full-text. The method 300 can be implemented with any suitable computing device, such as the computer 101 of FIG. 1. For example, the methods described below can be implemented by the processor set 110 of FIG. 1.

At block 302, LSH fingerprints are precomputed for subword units belonging to a vocabulary of a subword-unit tokenizer. In various examples, the LSH fingerprints are computed with an LSH-based method that satisfies the associativity property. In some examples, the LSH fingerprints may be pre-computed using a MinHash fingerprint. The main idea of MinHash is to compute multiple hash functions for each element of a set (e.g., the n-grams of the text) and represent the set with a fingerprint that corresponds to the minimum values, for each function, across all the elements of the set. Therefore, the fingerprint of a text is a vector of n positive integers, one for each of the n hash functions. A very interesting and powerful property of MinHash fingerprints is the associativity. For example, a MinHash fingerprint $F \in N^n$ is an array of n positive integers $F_0$ to $F_{n-1}$, computed with n distinct hash functions $h_0(x)$ to $h_{n-1}(x)$ mapping strings to positive integers. In various examples, the method 300 can rely on the associativity property of MinHash to calculate the MinHash fingerprint $F_T$ of each input token T. In particular, $F_T$ is computed by reusing the fingerprint of individual subword units in which the token T can be subtokenized. Since the number of different subword units is limited and known in advance given a pre-trained tokenizer, the fingerprints of all the subword units can thus be pre-computed and cached. For example, for each input token T, a processor can perform subword-unit tokenization. Subword-unit tokenization is a process which transforms each input token into a list of subword units. Then, for each subword unit u, the processor can calculate its fingerprint $F_u$ as follows. In the general case, each element $F_u^i$, with $0 \leq i < n$, is obtained by first applying a hash function $h_i(x)$ to each of the trigrams $v_0$ to $v_{k-1}$ extracted from the subword u, with $k \geq 1$. Then, $F_u^i$ is obtained as the minimum hash value across trigrams. For example, each element $F_u^i$ may be obtained using the equation:

$$F_u^i = \min(h_i(v_0), \ldots, h_i(v_{k-1})) \qquad \text{Eq. 1}$$

Figure 7:
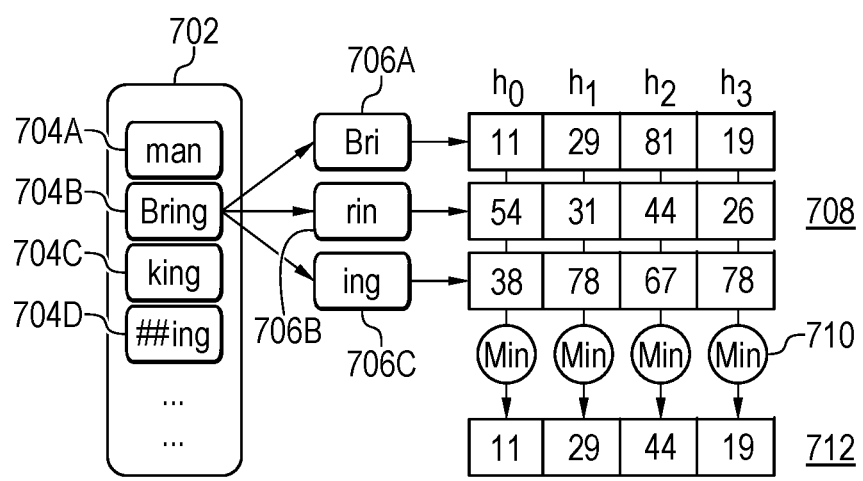
FIG. 7 is a block diagram of an example system for computing a MinHash fingerprint, for subword units, according to embodiments herein.

For example, for the subword unit "Bring", $F_{Bring}^i$ can be computed as $F_{Bring}^i = \min(h_i(\text{"Bri"}), h_i(\text{"rin"}), h_i(\text{"ing"}))$, as depicted and described in the example of FIG. 7. The output SimHash fingerprints may be vectors of integers.

Alternatively, in some embodiments, the processor may precompute the LSH fingerprints using SimHash. SimHash is a very similar technique to MinHash that has also been designed for detecting near-duplicate documents. To compute the SimHash value of a text, hash functions are computed over the different n tokens of a text. The n binary hash values $H_0, \ldots, H_{n-1}$ corresponding to the n tokens of the text A are first combined into an histogram $T_A$ of size k, where k corresponds to the size in bits of the hash values. For example, the size of the hash values may be 64 bits. The value $T_A^i$ of the histogram in position i, with $0 \leq i < k$ is computed by taking into account the bits $H_0^i, H_1^i, \ldots, H_{n-1}^i$.

In particular, the value of 1 is added to $T_A^i$ if $H_j^i$ is non-zero, and −1 otherwise. The final SimHash value for a text A is a k-bit binary vector storing the sign of $T_A$. In other words, +1 if the value is positive, and −1 otherwise. Like MinHash, SimHash offers associativity properties. In particular, given an histogram of the text A and the histogram of the text B, the histogram of A+B can be computed by aggregating the histograms $T_A$ and $T_B$. Accordingly, in various examples, if SimHash is chosen over MinHash, then the processor can compute a representation of each subword units, as depicted and described in the example of FIG. 8. In particular, in these embodiments, the computed histograms for each subword units are of size k, which corresponds to the size in bits of the hash function used. In some examples, the number of bits may be 256 for the algorithm SHASUM-256. In various examples, the histogram for the subword unit is computed by summing up the histograms corresponding to the each n-gram. The SimHash fingerprints may be binary vectors.

At block 304, token-level fingerprints for each token in a received window of text are computed. For example, the token-level may be at the level of a word. In various examples, the token-level fingerprints may be computed for each token based on a number of precomputed LSH fingerprints. In some examples, the processor can perform subword-unit tokenization of each individual word in the window. For example, the processor can tokenize the received text into tokens and, for each of the tokens, perform a subword-unit tokenization. With the precomputed table storing MinHash or SimHash fingerprints for each subword-unit in the vocabulary, a final representation can be computed using the associativity property of MinHash or SimHash. As one example, the MinHash fingerprint of a word w made of the subword units $w_0, \ldots, w_{k-1}$ can be efficiently computed as the minimum, element-wise of each subword-unit fingerprint $F_{w0} \ldots, F_{wk-1}$. Again, this process is possible due to the associativity property of MinHash. In various examples, the output token-level fingerprint using MinHash may be stored as counting bloom filter. Bloom filters are a probabilistic data structure that stores elements of a set in a very compact form. Bloom filters can be used to perform membership queries over the set and can provide bounded guarantees in terms of false positive, and do not provide false negatives. Counting bloom filters are an extension to bloom filters that enable the addition and deletion of elements from the set represented by the data structure. In various examples, this property of counting bloom filters may be used to enable the efficient computation of text features over a sliding window of text. Alternatively, in some examples, the SimHash histogram of a word w made of the subword units $w_0, \ldots, w_{k-1}$ can be computed by summing up the histograms corresponding to each word. The output token-level fingerprint using SimHash may thus be a histogram. In these manners, computing LSH hash functions over a given text is completely avoided because the representation of subword units are pre-computed and cached. In particular, in either case, the representation of a text is obtained as an aggregation of pre-computed representations. The aggregation may thus only use efficient operations in the integer space, such as minimum and sum operations.

At block 306, a window representation for the window of text is computed based on the token-level fingerprints. In various examples, the text representation for a window of text uses as input the MinHash fingerprints of each word, or the SimHash histograms, depending of the LSH technique in use. In the example of MinHash, the processor can store the individual representations, or the fingerprints of each word, in a Counting Bloom Filter (CBF). The CBF data structure can be directly used to compare the text of the window with the query text. In particular, when two texts are similar at the character level, the corresponding CBFs storing their MinHash fingerprints will have a high cosine similarity. Moreover, the CBF data structure supports addition and removal of elements. The processor may use this property to have an efficient method to update the CBF while sliding the window. An example MinHash-based window representation calculated is described in FIG. 9. Alternatively, in the example of SimHash, the processor can use as a representation the k-bit SimHash fingerprint storing the sign of the SimHash histogram, built by summing up the histogram of each individual words. This way, comparing the input representation of the input query q will consist of computing the Hamming distance between the fingerprint of the query (encoded as k-bit fingerprint) and the windows' fingerprint. An example overall process of computing a window representation using SimHash is described with respect to FIG. 10. As previously discussed, the MinHash is associative. Due to this property, the processor can compute the fingerprint of an entire window as the minimum value, element-wise, of the fingerprints corresponding to individual words. The fingerprint of the first window $w_0$ is stored as a CBF, which is practically a histogram of size s, where s is a configurable parameter. In various examples, each column of the histogram stores the number of times the fingerprint value $F_{w0}^i$ mod s has been seen. For example, the modulo operator may be used to store potentially large fingerprint values $F_{w0}^i$ into a small and fixed-size array. An example population of the CBF for a first window is described in the example of FIG. 11.

Figure 9:
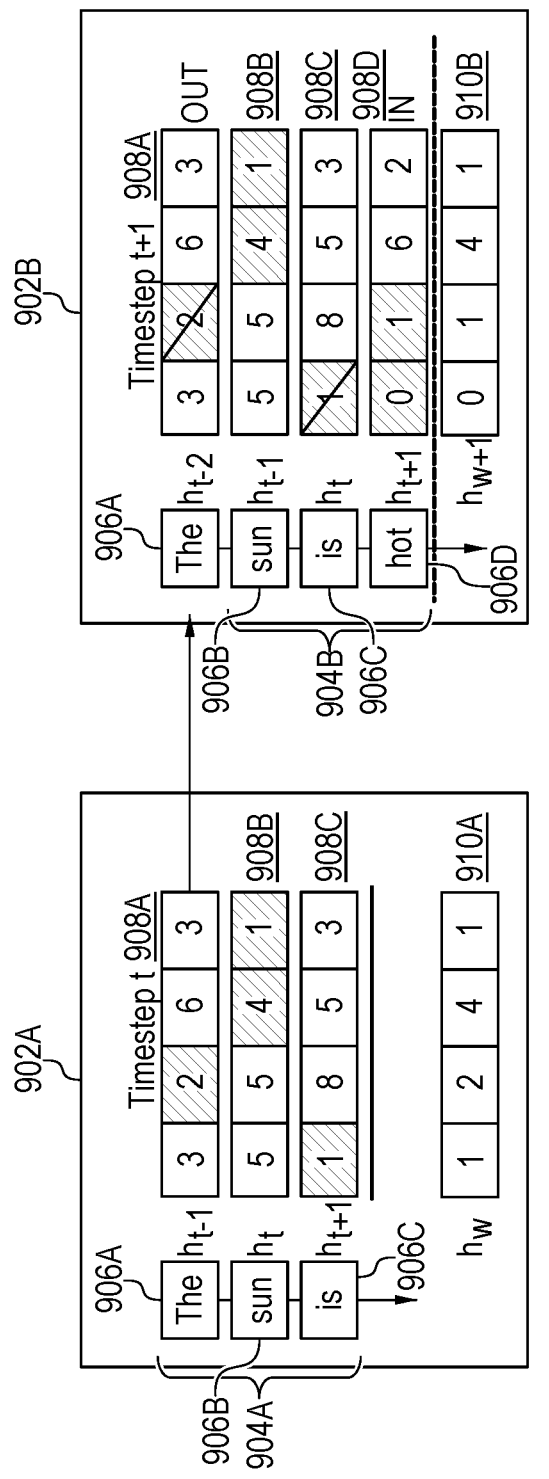
FIG. 9 is a block diagram of an example system for computing a sliding window representation using MinHash.
Figure 10:
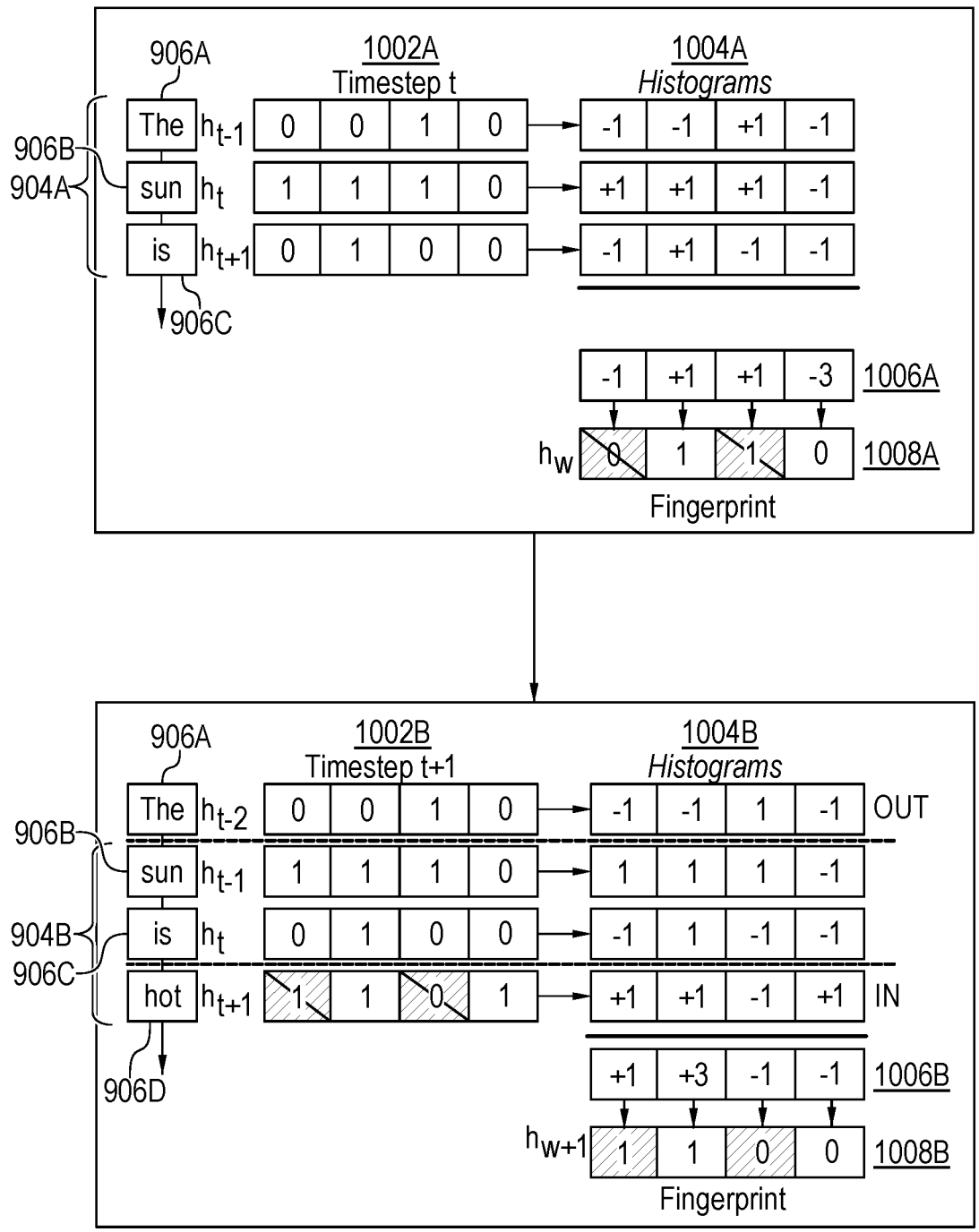
FIG. 10 is a block diagram of an example system for computing a sliding window representation using SimHash.

At block 308, the processor updates the window representation in a rolling scheme when sliding the window of text. For example, the processor can slide the window of text by a text unit, such as one word or phrase, and update the window representation without any hash computation over the full text of the slided window. In various examples, the processor can interchangeably use MinHash or SimHash to efficiently update the representation of text under the window. In various examples, the window may slide at the level of the word and not at the character level. In some examples, as in case of MinHash, updating the representation only involves changes to the Counting Bloom Filter. In some examples, as in case of SimHash, updating the representation only involves histogram changes. In both embodiments, the update is efficient and does not require any hash computation over the full text. The approach required to slide the window for the two LSH methods is depicted in FIGS. 9 and 10. In particular, an example process of updating the windows for MinHash is described in FIG. 9. An example process for updating the windows for SimHash is similarly described in FIG. 10. An example system process of sliding the window to the next window is also described in the example of FIG. 11. In these manners, the processor can update the window representation by taking into account the token-level fingerprint values of the token which enters and of the token which leaves the window. This operation does not require any computation of hash functions due to caching of hashes. In some examples, the processor can concurrently update a number of windows of increasing size. For example, instead of one window of size L, the processor can update N windows of size $L_0, \ldots, L_{N-1}$ where $L\_0 != \ldots != L_{N-1}$.

The process flow diagram of FIG. 3 is not intended to indicate that the operations of the method 300 are to be executed in any particular order, or that all of the operations of the method 300 are to be included in every case. For example, in some embodiments, the precomputation of LSH fingerprints may be excluded. Additionally, the method 300 can include any suitable number of additional operations.

Figure 4:
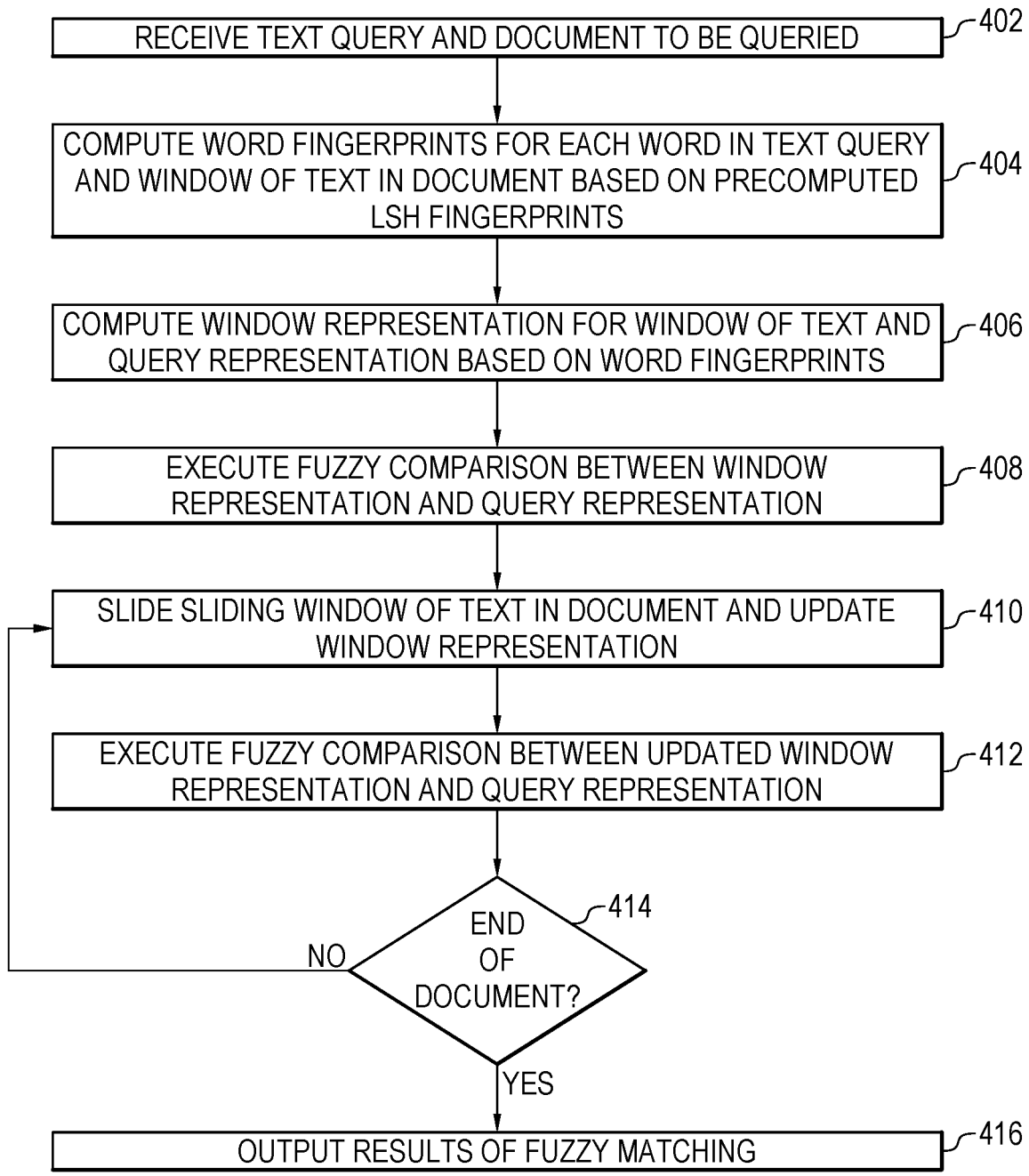
FIG. 4 is a process flow diagram of an example method that can perform fuzzy matching using updated window representations over a sliding window of text.

FIG. 4 is a process flow diagram of an example method that can perform fuzzy matching using updated window representations over a sliding window of text. The method 400 can be implemented with any suitable computing device, such as the computer 101 of FIG. 1. For example, the methods described below can be implemented by the processor set 110 of FIG. 1.

At block 402, a text query and document to be queried are received. For example, the text query may be one or more words.

At block 404, word fingerprints are computed for each word in text query and window of text in document based on precomputed LSH fingerprints. For example, the LSH fingerprints may be MinHash or SimHash fingerprints.

At block 406, a window representation and query representation are computed for the window of text and the input query based on the word fingerprints. In some examples, the window representation and query representation may be stored in the form of a counting bloom filter (CBF).

At block 408, a fuzzy comparison between window representation and query representation is executed. In various examples, the fuzzy comparison may be executed using any suitable similarity function. For example, in MinHash embodiments, the CBFs corresponding to the window representation may be directed compared to the CBF corresponding to the input text query using Jacccard similarity or the cosine similarity of the corresponding vectors. In SimHash embodiments, the text query is encoded using the bit representation of the histogram and the similarity function used is therefore the Hamming distance instead of the Jaccard similarity.

At block 410, a sliding window of text in document is slid to the next text unit and window representation is updated. For example, the text unit may be a phrase or entity. In various examples, the updated window representation is efficiently updated. For example, in the case of MinHash, updating the window representation may only involve changing the CBF. In the case of SimHash, updating the window representation may only involve histogram modifications.

At block 412, a fuzzy comparison between updated window representation and query representation is executed. For example, the fuzzy comparison may be executed using any suitable similarity function, as described in block 408.

At decision diamond 414, a determination is made as to whether the end of a document has been reached. If the end of a document has been reached, then the method may proceed to block 416. If the end of the document has not yet been reached, then the method may proceed at block 410.

At block 416, the results of the fuzzy matching are output. For example, the results may include a list of matching phrases. In some examples, a score for reach of the phrases may be output. For example, the score may be the cosine similarity between the query text and each of the results in the list.

The process flow diagram of FIG. 4 is not intended to indicate that the operations of the method 400 are to be executed in any particular order, or that all of the operations of the method 400 are to be included in every case. Additionally, the method 400 can include any suitable number of additional operations.

Figure 5:
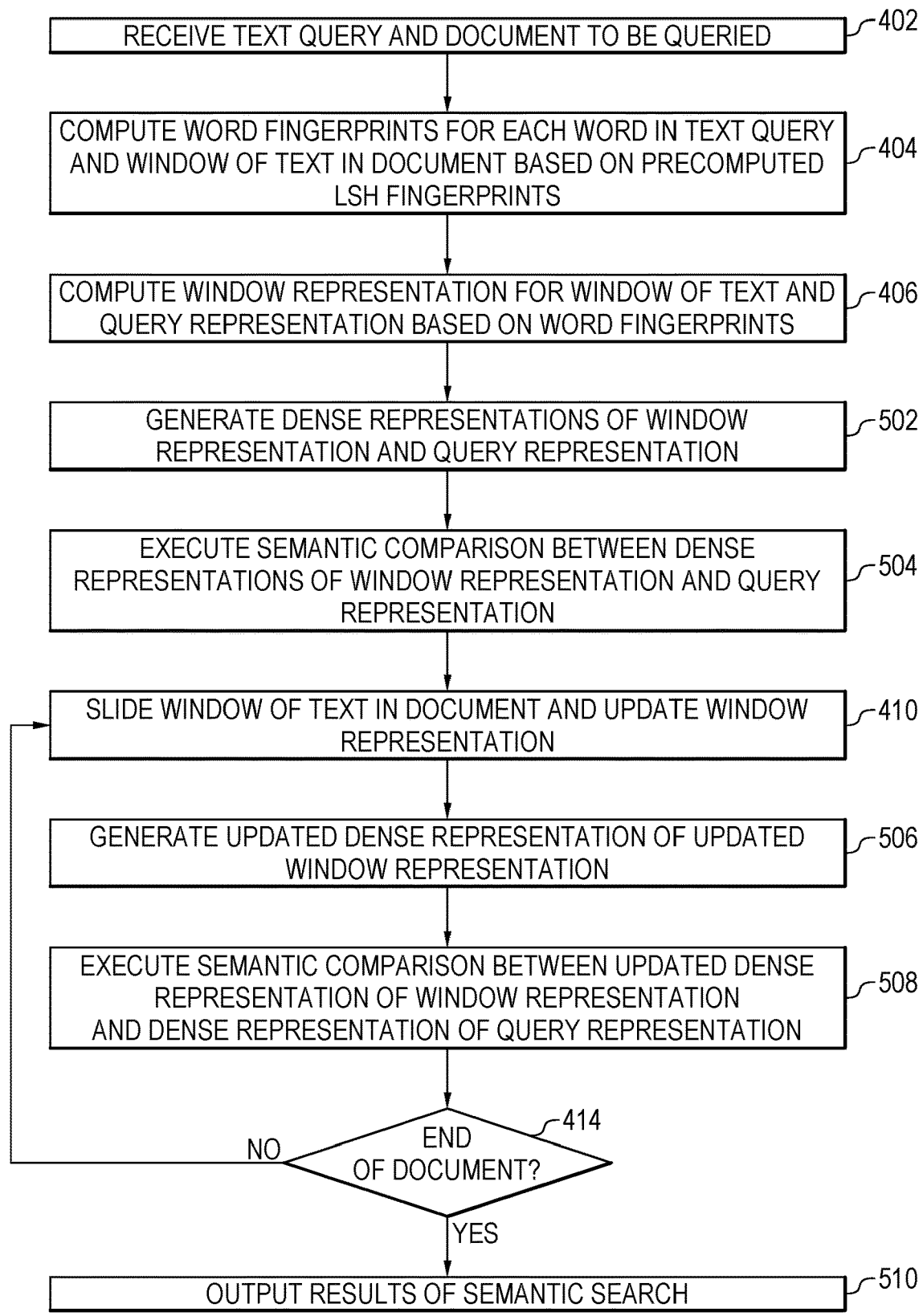
FIG. 5 is a process flow diagram of an example method that can perform semantic matching using updated window representations over a sliding window of text.

FIG. 5 is a process flow diagram of an example method that can perform semantic matching using updated window representations over a sliding window of text. The method 500 can be implemented with any suitable computing device, such as the computer 101 of FIG. 1. For example, the methods described below can be implemented by the processor set 110 of FIG. 1. The method 500 of FIG. 5 includes similarly numbered elements of FIG. 4. In particular, at block 402, a text query and document to be queried are received. At block 404, word fingerprints are computed for each word in text query and window of text in document based on precomputed LSH fingerprints. At block 406, a window representation and query representation are computed for the window of text and the input query based on the word fingerprints.

Figure 6:
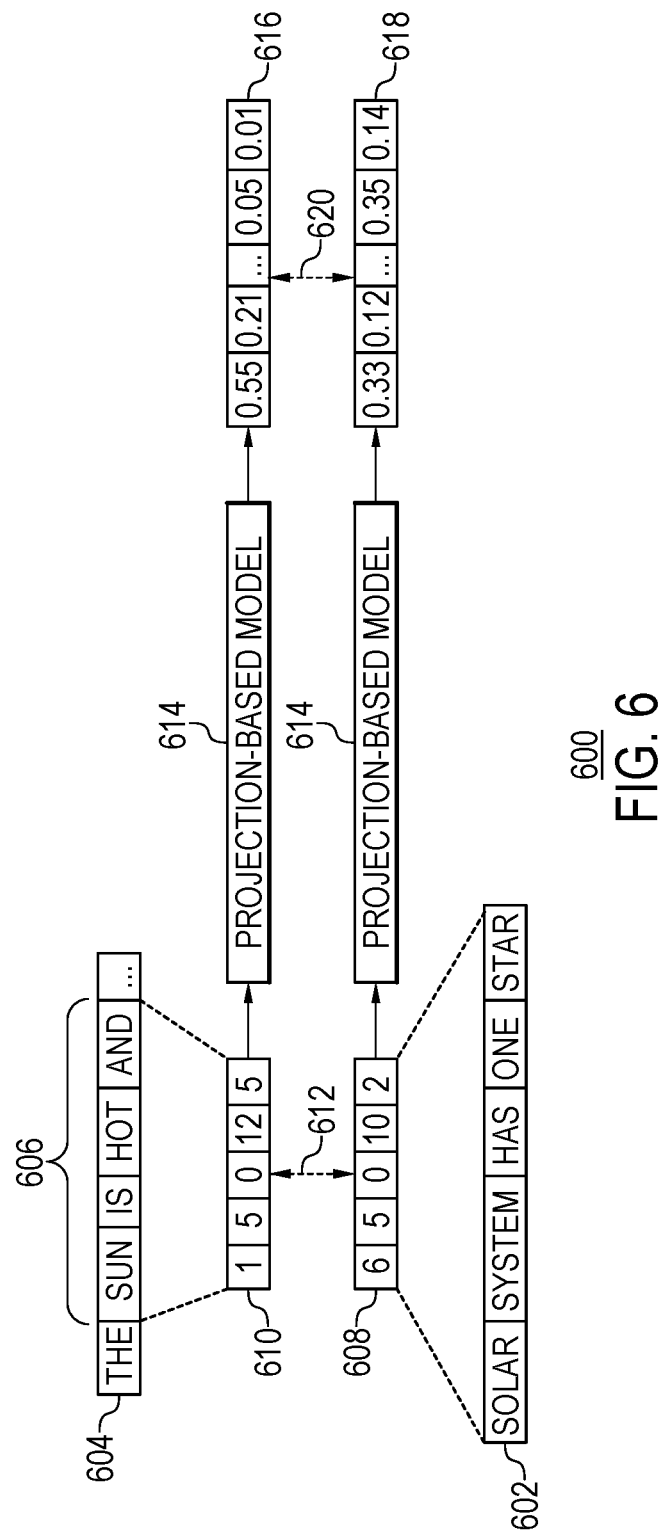
FIG. 6 is a block diagram of an example system for executing a fuzzy and semantic text search based on a shared text representation, according to embodiments described herein.

At block 502, dense representations of window representation and query representation are generated. For example, the dense representations may be generated using a projection-based model. In various examples, the window representation may be used as input for a projection-based sentence encoder model to infer a dense representation for the window. In some examples, a sentence encoder model may be distilled into a projection-based model to obtain a sentence encoder. In some examples, the projection to the dense space is performed only for windows of text having a window representation morphologically similar or totally dissimilar to the morphological representation of a list of input queries. For example, each window may potentially have two representations: one morphological representation like text representation 610 and another semantic representation like 616, as shown in FIG. 6. When performing a comparison on two windows, the processor can potentially use two thresholds: one for the morphological comparison and one for the semantic comparison. In some examples, as long as one of the comparison is similar enough, then the processor can consider the two windows similar. In some examples, the projection to the dense space is performed only for windows of text having a token with a representation morphologically similar or totally dissimilar to a morphological representation of a list of input queries. For example, the processor can consider there is at least one token overlap between a query and a window to compute the dense representation.

At block 504, a semantic comparison between dense representations of window representation and query representation is executed. The dense representation of the window may be compared with a dense representation of an input query to execute a semantic matching of the input query against the text in the window. For example, the semantic comparison may be executed using a distance calculated between the dense representations. For example, the distance between vectors of the dense representations may be calculated using any suitable distance function, such as cosine similarity. In some examples, the distance between the vectors may be calculated using the Euclidean distance between dense representation vectors.

At block 410, a sliding window of text in document is slid to the next text unit and window representation is updated. For example, text unit may be a phrase or entity. In various examples, the updated window representation is efficiently updated. For example, in the case of MinHash, updating the window representation may only involve changing the CBF. In the case of SimHash, updating the window representation may only involve histogram modifications.

At block 506, an updated dense representation of the updated window representation is generated. For example, the updated dense representation may be generated using the projection-based model by inputting the updated dense representation into the projection-based model and receiving an updated dense representation.

At block 508, a semantic comparison is executed between updated dense representation of window representation and dense representation of query representation. For example, the semantic comparison be executed using a distance calculated between the dense representations. For example, the distance may be calculated using any suitable distance function, as described in block 504.

At block 414 a determination is made as to whether the end of a document has been reached. If the end of a document has been reached, then the method may proceed to block 510. If the end of the document has not yet been reached, then the method may proceed at block 410.

At block 510, results of the semantic search are output.

The process flow diagram of FIG. 5 is not intended to indicate that the operations of the method 500 are to be executed in any particular order, or that all of the operations of the method 500 are to be included in every case. Additionally, the method 500 can include any suitable number of additional operations.

With reference now to FIG. 6, a block diagram shows an example system for executing a fuzzy and semantic text search based on a shared text representation, according to embodiments described herein. The example system is generally referred to by the reference number 600. FIG. 6 includes an input query 602 and a received text 604. For example, the input query 602 may be a sentence of words that is to be matched against the text 604 for similarity in both form via fuzzy matching and meaning via semantic matching. The system 600 includes a window 606. For example, the window 606 may be a sliding window of words in text 604. In various examples, the number of words in the sliding window 606 may match the number of words in the received query 602. The system 600 includes a query representation 608 shown including five values. In various examples, the query representation 608 is a morphological representation of the input query 602. For example, the query representation 608 may be generated using any suitable LSH-based method, such as the MinHash fingerprint method described in FIG. 7 or the SimHash fingerprint method described in FIG. 8.

In the example of FIG. 6, the system 600 unifies fuzzy string matching and semantic search using the same text representation. For example, the input query 602 for the system may be a text query q, which can be one or multiple words. Given input query 602, a task may include finding all the occurrences of text that is morphologically or semantically similar in the text 604 using a sliding window approach. In particular, morphological similarity can be used to find occurrences that are not exactly the same at the byte or character level, but similar enough such as in the cases of misspellings. This notion of detecting morphological similarity is also referred herein as fuzzy matching. In addition, semantic similarity can be used to find concepts which are related in terms of meaning, even if they have a completely different surface form. As one example, of semantic similarity, "support vector machine" is semantically close to "logistic regression." In various examples, the system 600 uses an algorithmic approach that unifies morphological similarity and semantic similarity. In particular, the system 600 can generate a text representation 610 of a given window of text 606 which can be directly used to enable fuzzy matching 612, and can also be updated efficiently when sliding the window 606, and can further be used without modification as an input feature for projection-based models 614 to enable semantic searches via the semantic matching 620.

Similar to rolling hashing approaches, the system 600 can slide over the text using a window of a fixed size. In the example of FIG. 6, the fixed window size is five tokens, which are words in this example. The main difference with previous rolling window approaches is that instead of sliding the window at the character level, we rely on subword-unit tokenization schemes to move the window at the subword-unit level. In this manner, the sliding window 606 can be moved multiple characters to the right for a single sliding step, increasing the efficiency of the method.

In contrast with exact matching algorithms, the system 600 uses a representation for the text under the current window 606 that is not a standard hash function, but an LSH function. In particular, LSH functions for text offer associativity properties. Thus, the window sliding mechanism that updates sliding window 606 relies on the associativity property of an LSH function, such as MinHash or SimHash. In this manner, sliding the window 606 by a single word does not require recomputing the representation from scratch for the entire window 606. Instead, the system 600 can rather update the window representation 610 by taking into account the leftmost word (or subword unit) falling outside of the window 606 and the new word at the right entering into the new window 606. Thanks to the associativity property of MinHash or SimHash, the window representation 610 that provides a fingerprint for the entire window 606 can be efficiently updated.

Additionally, instead of relying on character-level hash functions, the system 600 uses subword unit tokenizers, which transform the text into sequences of subword units belonging to a fixed vocabulary. Therefore, in various examples, the system 600 can precompute the representation of all the subword units and store the subword unit representations in a cache of a limited size. For example, the cache size may be in the order of megabytes. By using caching, sliding the window 606 does not require any computation of hash functions over text.

Still referring to FIG. 6, the system 600 may thus enable fuzzy matching. For example, in embodiments using a MinHash LSH function, a user may pose as input for the search system the text query q 602, which will need to be encoded once as a counting bloom filter (CBF) storing its MinHash fingerprints. By construction, one can compare the CBF corresponding to the input query 602 to be encoded once to extract the query representation 608. In the example of MinHash, the query representation 608 for the input query 602 is the counting bloom filter storing its MinHash fingerprints. By construction, one can compare the CBF corresponding to the windows $w_0, \ldots, w_n$ directly using the Jaccard similarity or the cosine similarity of the corresponding vectors. These similarity functions can be used to compare the input query 602 with the window query 606 from a morphological point of view. In embodiments using SimHash, the input query 602 can be encoded using the bit representation of the histogram and the similarity function used may be the Hamming distance instead of the Jaccard similarity. By construction, the CBFs corresponding to multiword expressions such as programming language and programming languages may have a high cosine similarity.

Figure 12:
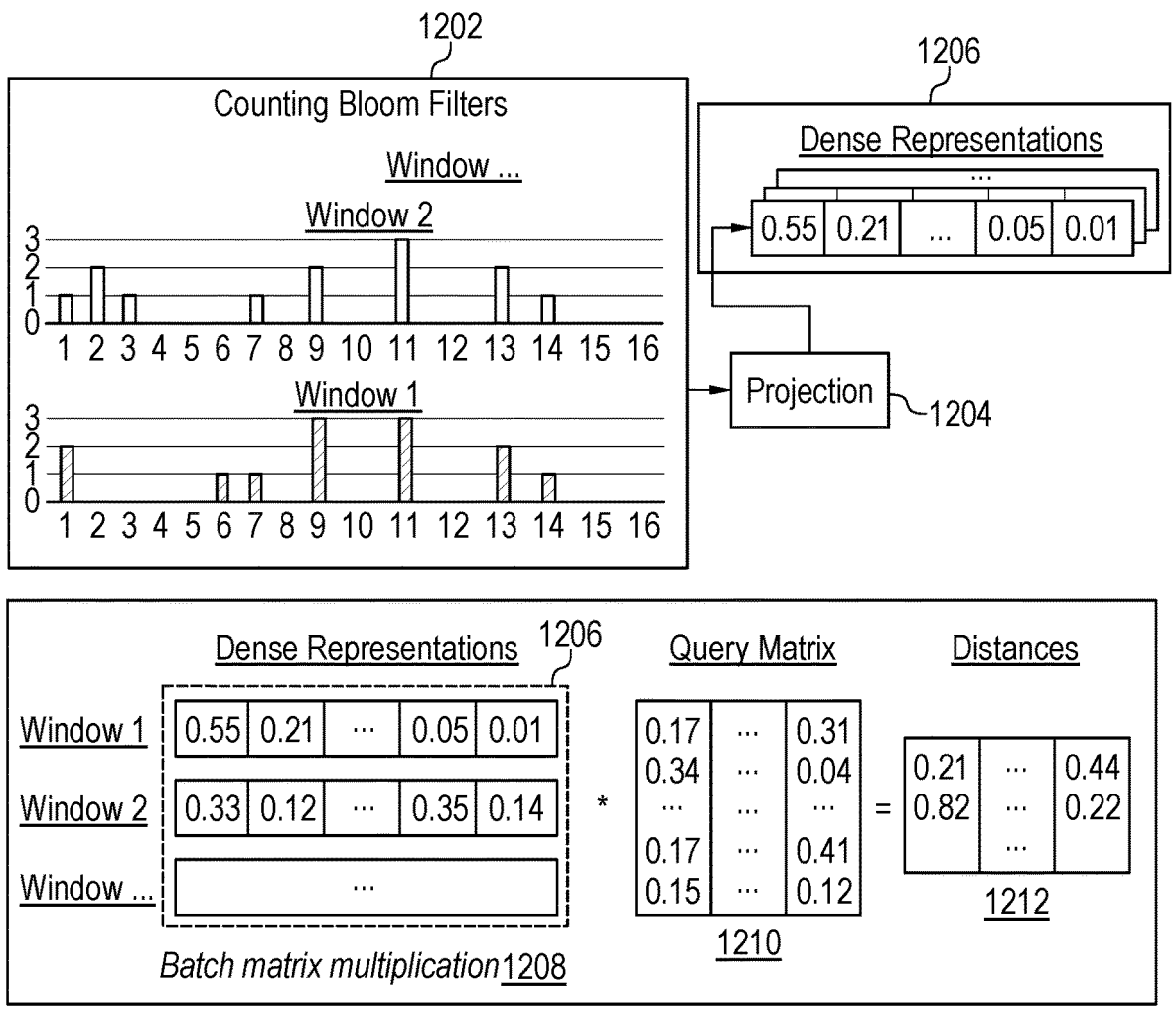
FIG. 12 is a block diagram of an example system for efficiently calculating distances for a number of sliding window dense representations using batch matrix multiplication.

In addition, the system 600 enables semantic similarity. For enabling of semantic similarity, the system 600 includes the projection-based model M 614 capable of projecting a discrete features such as the CBF into a dense representation. For example, instead of storing embedding vectors for entire words or subword units, a projection-based model M 614 may be used as a feature extractor that captures morphological features and represents the morphological features in a discrete feature. For example, the features may be represented as hash values. To make the feature useful for the model, the projection-based model M 614 includes a bottleneck layer transforms the feature into a dense representation, which is then used within the projection-based model M 614. For example, the bottleneck layer is a linear layer responsible for this discrete to dense transformation. In various examples, the system 600 may be trained by training sentence encoders with any suitable projection-based model 614, such as the pNLP-Mixer, first released 2022, updated accordingly. For example, the pNLP-Mixer is a projection-based multi-layer perceptron (MLP)-Mixer model for natural language processing (NLP). More specifically, in various examples, the sentence encoder produces a sentence-level representation. As one specific example, a projection-based sentence encoder may include using pre-trained sentence encoders as teacher models and use a projection-based architecture such as the pNLP-Mixer as a student in a distillation setup. For example, the student is updated to produce a sentence-level representation similarly as current transformer-based models. After distillation, a single forward pass with a projection-based model will produce a vector representation of the text which can be compared with the dense representation of the input query obtained in a similar way. In some examples, of the system, the system 600 can perform the forward pass using a batch of multiple windows to improve the efficiency, as depicted in the example of FIG. 12.

It is to be understood that the block diagram of FIG. 6 is not intended to indicate that the system 600 is to include all of the components shown in FIG. 6. Rather, the system 600 can include fewer or additional components not illustrated in FIG. 6 (e.g., additional queries, or additional text, models, comparisons, window representations, query representations, dense representations, etc.).

With reference now to FIG. 7, a block diagram shows an example system for computing a MinHash fingerprint, for subword units, according to embodiments herein. The example system 700 of FIG. 7 includes a vocabulary 702 including subword units 704A, 704B, 704C, and 704D, among other subword units. The system 700 includes n-grams 706A, 706B, 706C of subword unit 704B. In the example of FIG. 7, the n-grams 706A, 706B, and 706C are more specifically trigrams of three letters. The system 700 includes hashes 708 computed for each of the n-grams 706A. The system 700 also includes a minimum function 710 that takes the minimum value of hash values 708 computed for each hash function $h_0$, $h_1$, $h_2$, $h_3$. The system 700 includes a resulting MinHash fingerprint 712.

In the example of FIG. 7, the MinHash fingerprint 712 of a subword unit 704B contains the minimum hash values computed over the trigrams 706A, for each hash function $h_0$-$h_3$. In various examples, token-level fingerprints for a given token may be computed by aggregating the fingerprints of its subword units in a similar way. For example, the minimum values of the subword units may be similarly selected for inclusion in a token-level fingerprint of the fingerprints of the subword units.

It is to be understood that the block diagram of FIG. 7 is not intended to indicate that the system 700 is to include all of the components shown in FIG. 7. Rather, the system 700 can include fewer or additional components not illustrated in FIG. 7 (e.g., additional words, or additional subword units, n-grams, hash functions, MinHash fingerprints, etc.).

Figure 8:
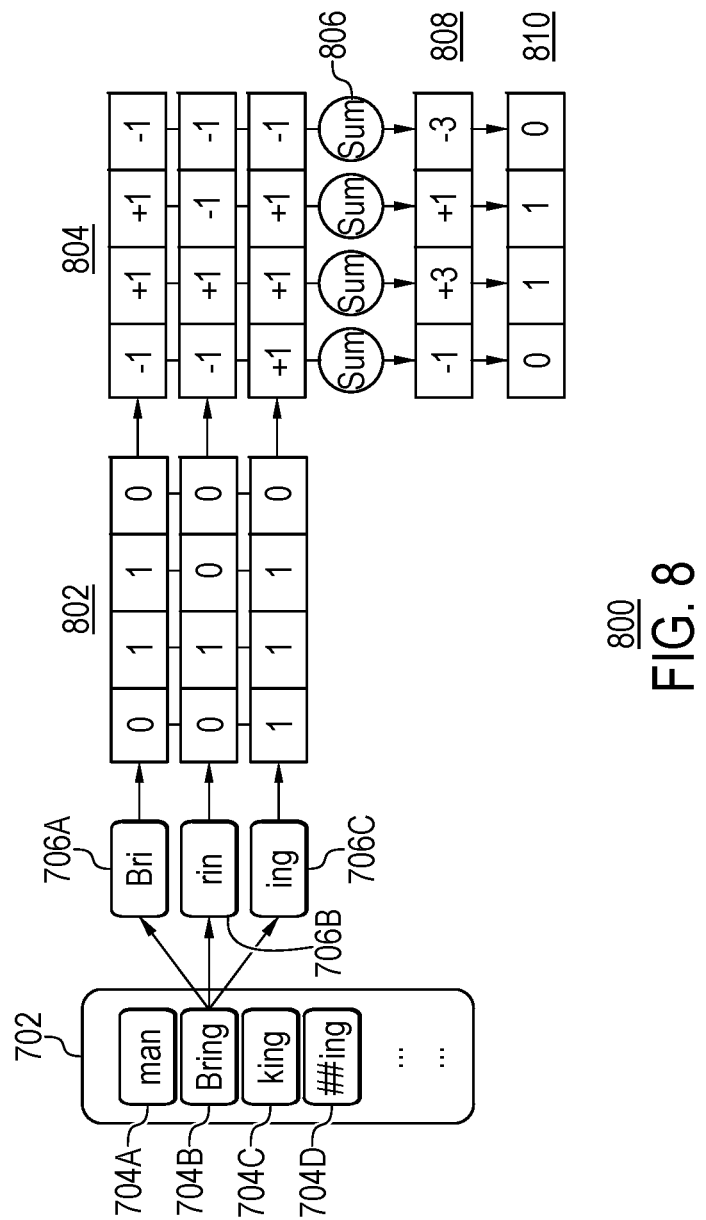
FIG. 8 is a block diagram of an example system for computing a SimHash fingerprint for subword units, according to embodiments herein.

With reference now to FIG. 8, a block diagram shows an example system for computing a SimHash fingerprint for subword units, according to embodiments herein. The example system 800 of FIG. 8 includes similarly numbered elements from FIG. 7. In particular, FIG. 8 includes vocabulary 702, subword units 704A, 704B, 704C, and 704D, and n-grams 706A, 706B, and 706C. The system 800 further includes hashes 802. The system 800 also includes histograms generated from hashes 802. The system 800 further includes a summation function 806. The summation function 806 is shown generating a SimHash histogram 808 from the histograms 804. The system 800 also further includes a SimHash fingerprint 810 shown generated based on the SimHash histogram 808.

In the example of FIG. 8, the SimHash fingerprint 810 of a subword unit 704B "Bring" is computed. In particular, a histogram 804 of binary hash values may first be computed based on the hash values 802. For example, the values in the histogram 804 may be +1 in case the corresponding bit in the hash 802 is 1, −1 if the corresponding bit in the hash 802 is 0. A SimHash histogram 808 is then computed by summing together the histogram 804 of binary hash values. Finally, in various examples, the SimHash fingerprint is computed based on the SimHash histogram 808 by replacing values greater than zero with "1" and values not greater than zero with "0". In various examples, fingerprints for a given token are computed by summing the fingerprints of its subword units in a similar way.

It is to be understood that the block diagram of FIG. 8 is not intended to indicate that the system 800 is to include all of the components shown in FIG. 8. Rather, the system 800 can include fewer or additional components not illustrated in FIG. 8 (e.g., additional words, or additional subword units, n-grams, histograms, SimHash fingerprints, etc.).

With reference now to FIG. 9, a block diagram shows an example system for computing a sliding window representation using MinHash. The example system is generally referred to by the reference number 900. The system 900 of FIG. 9 is shown operating at a first timestep 902A and second timestep 902B. The first timestep 902A is associated with a first window 904A and the second timestep 902B is associated with a second window 904B. The system 900 is shown receiving text including words 906A, 906B, 906C, and 906D. In particular, the word 906A is "The", the word 906B is "sun", the word 906C is "is", and the word 906D is "hot". At timestep 902A, the sliding window 904A includes the words 906A, 906B, 906C while at timestep 902B the sliding window 904B includes the words 906B, 906C, and 906D.

In the example of FIG. 9, the MinHash system 900 stores the minimum and the second minimum for each window 904A and 904B. When the system 900 rolls the window 904A to the window 904B of step t+1 902B, if the old hash $h_{t-2}$ 908A has a minimum value $F^i = h_{t-2}^i$, then the system 900 updates fingerprint $F^i$ 910A to the new fingerprint 910B by taking the minimum between the second minimum (either $h_{t-1}^i$ or $h_t^i$) or the new value $h_{t+1}^i$. In the example of FIG. 9, two minimums are updated. The first minimum updated is the value of "2" from old hash 908A, which is replaced by the new minimum of "1" in new hash 908D. In addition, the minimum of "1" from hash 908C is updated with the new minimum of "0" in new hash 908D. The resulting new MinHash fingerprint 910B therefore has updated values (0,1,4,1).

It is to be understood that the block diagram of FIG. 9 is not intended to indicate that the system 900 is to include all of the components shown in FIG. 9. Rather, the system 900 can include fewer or additional components not illustrated in FIG. 9 (e.g., additional or different tokens, or additional windows, timesteps, etc.).

With reference now to FIG. 10, a block diagram shows an example system for computing a sliding window representation using SimHash. The example system 1000 of FIG. 10 includes similarly referenced elements described in FIG. 9. For example, the system 100 includes In addition, the system 1000 includes windows 904A and 904B, and words 906A, 906B, 906C, and 906D as input. The system 1000 also further includes binary hashes 1002A and 1002B, and corresponding histograms 1004A and 1004B. The system 100 further includes SimHash histograms 1006A and 1006B, and corresponding SimHash fingerprints 1008A and 1008B.

In the example of FIG. 10, an example representation update algorithm is shown for the case of SimHash. Similar to MinHash in FIG. 9, updating the windows only uses integer operations. In practice, sliding the window is even more efficient than the example of MinHash as it only involves summing the histograms 1004B of the word 906D entering and the word 906A leaving the window 904B. In particular, the conditional instruction to keep the minimum is avoided, making the update process more efficient in modern superscalar processors and amenable to Single Instruction, Multiple Data (SIMD) vectorization.

Still referring to FIG. 10, the SimHash stores a current histogram 1004A and 1004B for each window from which a binary fingerprint 1008A and 1008B is then computed. When the processor rolls the window to step t+1 904B, the processor subtracts from the current histogram $h_{t+1}$ 1004A the histogram $h_{t-2}$ from the step t and adds the new histogram at step t+1. In the example of FIG. 10, the old histogram associated with word 906A has values of (−1,−1,1,−1) and the new histogram associated with word 906D has values of (1, 1, −1, 1). Thus, the old finger print 1008A having values of (0,1,1,0) has its first and third values updated to reflect the new histogram values, resulting in the SimHash fingerprint 1008B with values (1,1,0,0).

It is to be understood that the block diagram of FIG. 10 is not intended to indicate that the system 1000 is to include all of the components shown in FIG. 10. Rather, the system 1000 can include fewer or additional components not illustrated in FIG. 10 (e.g., additional or different tokens, or additional timesteps text, histograms, or fingerprints, etc.).

Figure 11:
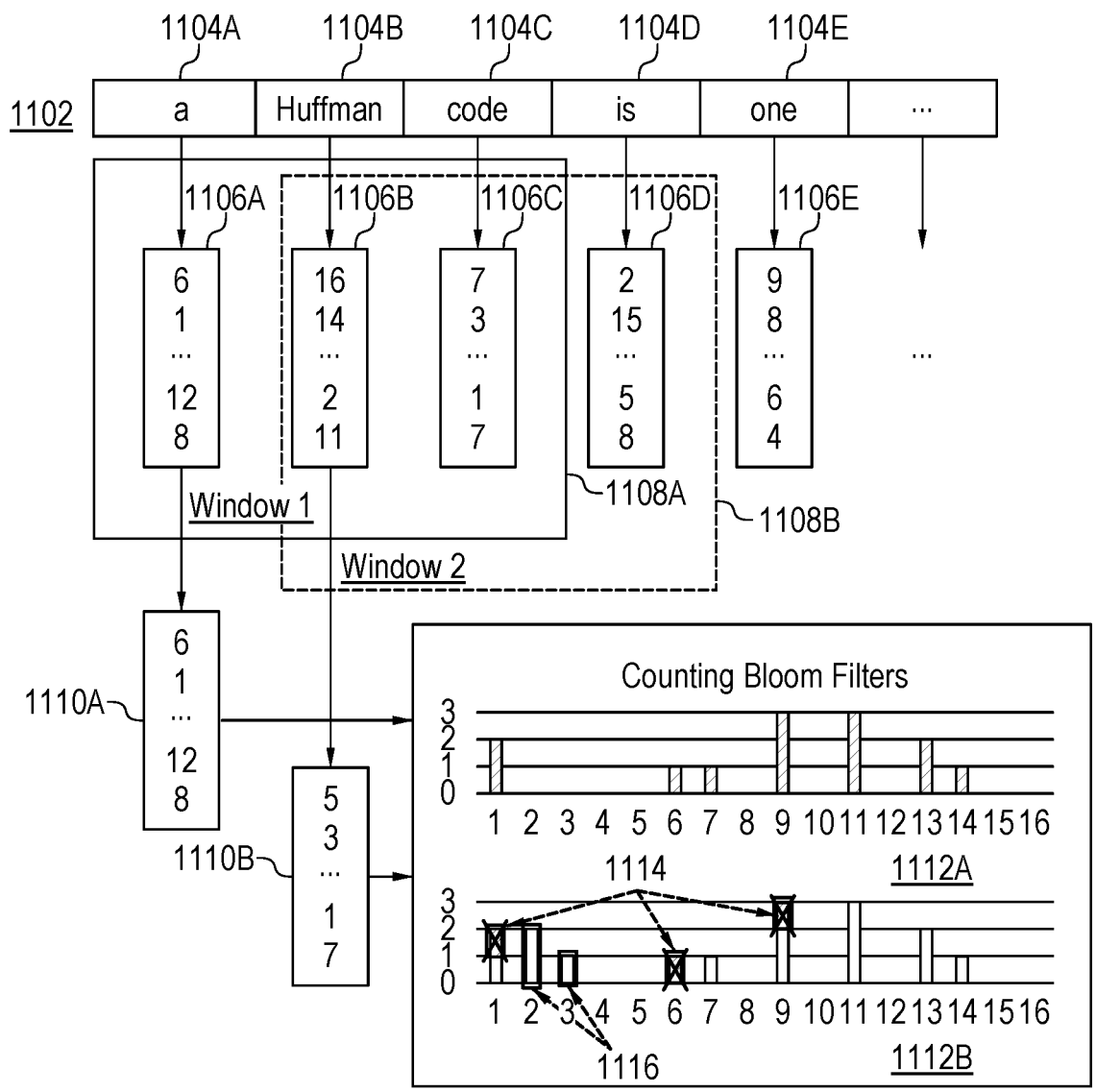
FIG. 11 is a block diagram of an example system for populating a counting bloom filter (CBF) for a first window and sliding the window to the next one, according to embodiments described herein.

With reference now to FIG. 11, a block diagram shows an example system for populating a counting bloom filter (CBF) for a first window and sliding the window to the next one, according to embodiments described herein. The example system 1100 of FIG. 11 includes an input text 1102 including words 1104A, 1104B, 1104C, 1104D, and 1104E, among others. The system 1100 includes a set of corresponding hashes 1106A, 1106B, 1006C, 1106D, and 1106E computed for words 1104A, 1104B, 1104C, 1104D, and 1104E. The system 1100 also includes two windows 1108A and 1108B representing the position of a sliding window at two different positions along the input text 1102. As seen in FIG. 11, the size of the sliding window in system 110 is four tokens, which are words in the example of FIG. 11. The system 1100 further includes MinHashes 1100A and 1100B generated for windows 1106A and 1106B, respectively. In addition, the system 1100 includes counting bloom filters 1112A and 1112B.

Still referring to FIG. 11, in various examples, counting bloom filters 1112A and 1112B may be used to store values of input queries and window representations for a sliding window.

In the example of FIG. 11, the system 1100 computes the hashes of each word. Then, for each window, the system 1100 computes the MinHash fingerprint of the words' hashes and produces a counting bloom filter (CBF) 1112A. For the next window, the system 1100 does not recompute a CBF from scratch, but instead updates the previous CBF. In the example of FIG. 11, hash values in the range from 1 to 16 are assumed to fit the buckets of the counting bloom filter. However, in practice, the hash values may be significantly larger than the counting bloom filter size. Therefore, in various examples, the system 110 may use the modulo operator to reduce the size of the hash values. For example, the hash value may be between 1 and the size of the counting bloom filter.

Still referring to FIG. 11, when moving from the window w 1108A to the next window w+1 1108B, the counting bloom filter 1112A can be updated to counting bloom filter 1112B by taking into account the word which goes out of the window with fingerprint Four and the word which enters the window with fingerprint $F_{IN}$. In the particular example of FIG. 11, the word "a" 1104A is being left out, and the new word "is" 1104D is being added in. In various examples, the removal process takes into account the minimum value of the fingerprint for each position i. For example, if the fingerprint value $F_w^i$ is coming from $T_{OUT}^i$, then the histogram corresponding to the fingerprint value from the CBF is decreased by one, and the histogram corresponding to the minimum value is increased by one. The minimum value is the minimum between $F_{IN}^i$ and the second minimum of the window w. In the example of FIG. 11, old elements 1114 are accordingly removed and new elements 1116 are accordingly added to the updated counting bloom filter 1112B. Therefore, in this manner, updating the window representation only uses integer operations and a conditional to keep the minimum updated.

It is to be understood that the block diagram of FIG. 11 is not intended to indicate that the system 1100 is to include all of the components shown in FIG. 11. Rather, the system 1100 can include fewer or additional components not illustrated in FIG. 11 (e.g., additional or different tokens, or additional windows, counting bloom filters, etc.).

With reference now to FIG. 12, a block diagram shows an example system for efficiently calculating distances for a number of sliding window dense representations using batch matrix multiplication. The example system 1200 of FIG. 12 includes a set of counting bloom filters 1202. The system 1200 includes a projection 1204 generating a set of dense representations 1206. For example, the projection 1204 may executed by a projection-based model. The system 1200 includes a batch matrix multiplication 1208 that includes performing a matrix multiplication of the dense representations 1206 with a query matrix 1210 to result in a set of distances 1210.

In the example of FIG. 12, given a counting bloom filter 1202 for each of a number of windows, a projection-based model computes the dense representations 1206 as indicated in projection 1204. The dense representations 1206 are then used to compute the cosine similarity with a matrix storing the dense representations 1206 of the input query.

It is to be understood that the block diagram of FIG. 12 is not intended to indicate that the system 1200 is to include all of the components shown in FIG. 12. Rather, the system 1200 can include fewer or additional components not illustrated in FIG. 12 (e.g., additional windows, counting bloom filters, or additional projections, dense representations, distances, etc.).

FIG. 13 is a screenshot of an example results of a fuzzy matching executed according to embodiments described herein. The screenshot 1300 of FIG. 13 includes a keyword 1302 used as query input and a list 1304 of resulting matches.

To demonstrate the behavior of embodiments described herein, 500,000 multiword expressions were extracted from the arXiv2 scientific article database. Then, the counting bloom filter of each multiword expression was computed and the CBFs embedded and cosine similarity computed at scale to obtain the top-k similar terms given a query. The results for querying "graph neural network" on the resulting system are shown in FIG. 13.

As seen in FIG. 13, prefixations and suffixations, such as novel graph neural network, graph, and neural network model are captured. However, more impressively, using the counting bloom filter enables fuzzy matching. In particular, multiword expressions were found that are somehow similar to the query but cannot be found with standard search tools. For example, in addition to prefixations and suffixations, the embodiments described herein were shown to be able to capture typos and affixations with infixes. For example, the list 1304 includes "graph convolutional neural network". The embodiments were also shown to capture similar morphological-level words. For example, "graphene network" is included in the list 1304. Thus, the embodiments described herein enable the matching of non-trivial variations, such as typos, inserting words as infixes, or morphologically-similar terms, in addition to trivial variations, such as plural forms, or terms with adjectives prepended or appended.

FIGS. 14A and 14B are tables 1400A and 1400B of example results of a semantic similarity executed according to embodiments described herein. The tables 1400A and 1400B includes example queries 1402A, 1402B, 1402C, 1402D, and 1402E. The tables 1400A and 1400B further include a list of top results for each of example queries 1402A, 1402B, 1402C, 1402D, and 1402E with corresponding cosine similarity scores.

To demonstrate the effectiveness of the produced semantic sentence-level representations, an updated version of the pNLP-Mixer was trained in a distillation fashion on one million sentences from Wikipedia. Then, the trained model was queried with several sentences that were semantically different. Tables 1400A and 1400B show some example outputs of some of the example queries 1402A, 1402B, 1402C, 1402D, and 1402E. As shown in FIGS. 14A and 14B, the top results for queries 1402A, 1402B, 1402C, 1402D, and 1402E are observably highly similar to the query sentences of queries 1402A, 1402B, 1402C, 1402D, and 1402E in terms of semantics.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising a processor;
one or more computer-readable storage media; and
program instructions stored on the one or more computer-readable storage media to cause the processor to:
compute a token-level fingerprint for each of a plurality of tokens of a text query and in a received window of text of a document to be queried, wherein a subset of tokens within the plurality of tokens are subword unit tokens;
compute a window representation for the received window of text based on token-level fingerprints associated with the received window of text, wherein the window representation comprises a counting bloom filter;
compute a query representation for the text query based on token-level fingerprints associated with the text query;
update the window representation in a rolling scheme when sliding the window of text to generate a second window representation, wherein the counting bloom filter is updated to generate a second counting bloom filter when sliding the window of text to generate the second window representation, the second counting bloom filter corresponding to the second window representation;
execute a fuzzy comparison between the second window representation and the query representation; and
output results of the fuzzy comparison.

2. The system of claim 1, wherein a second subset of tokens within the plurality of tokens comprise words.

3. The system of claim 1, wherein the token-level fingerprints comprise histograms.

4. The system of claim 1, wherein the window representation comprises a window-level fingerprint of merged token-level fingerprints of all the plurality of tokens within the window of text.

5. The system of claim 1, wherein the processor is configured to input the window representation into a projection-based sentence encoder model to infer a dense representation for the window of text.

6. A computer-implemented method, comprising:
computing, via a processor, a token-level fingerprint for each of a plurality of tokens of a text query and in a received window of text of a document to be queried;
computing, via the processor, a window representation for a window of text based on token-level fingerprints associated with the window of text, wherein the window representation comprises a counting bloom filter;
computing a query representation for the text query based on token-level fingerprints associated with the text query;
updating the window representation in a rolling scheme when sliding the window of text to generate a second window representation, wherein the counting bloom filter is updated to generate a second counting bloom filter when sliding the window of text to generate the second window representation, the second counting bloom filter corresponding to the second window representation;
executing a fuzzy comparison between the second window representation and the query representation; and
outputting results of the fuzzy comparison.

7. The computer-implemented method of claim 6, further comprising inferring a dense representation for the window of text using the window representation, wherein the dense representation is inferred for the window of text using the window representation as input for a projection-based sentence encoder model.

8. The computer-implemented method of claim 6, wherein computing the token-level fingerprint for each of the plurality of tokens is based on a plurality of locality-sensitive hashing (LSH) fingerprints.

9. The computer-implemented method of claim 8, wherein the LSH fingerprints are computed for a plurality of subword-units within the received window of text.

10. The computer-implemented method of claim 6, wherein the plurality of tokens includes a subword unit token, wherein the subword unit token has a token-level fingerprint used to compute the window representation.

11. The computer-implemented method of claim 6, further comprising inferring a dense representation for the window of text using the window representation, wherein the dense representation for the window of text is inferred in response to determining that the window representation is morphologically similar to a morphological representation of a list of input queries.

12. The method of claim 6, further comprising inferring a dense representation for the window of text using the window representation, wherein the dense representation of the window of text is generated using the counting bloom filter, wherein a second dense representation is generated using the second counting bloom filter.

13. A computer program product for computing window representations of text, the computer program product comprising a computer-readable storage medium having program code embodied therewith, the program code executable by a processor to cause the processor to:

compute a token-level fingerprint for each of a plurality of tokens of a text query and in a received window of text of a document to be queried;

compute a window representation for a window of text based on token-level fingerprints associated with the window of text;

compute a query representation for the text query based on token-level fingerprints associated with the text query;

infer a dense representation of the window of text using the window representation; and compare the dense representation of the window of text with a dense representation of the text query to execute a semantic matching of the text query against the text in the window by performing a matrix multiplication between a first matrix corresponding to the dense representation of the window of text and a second matrix corresponding to the dense representation of the text query to generate a set of distances; and output results of the semantic matching.

\* \* \* \* \*